United States Patent
Zielinski et al.

(10) Patent No.: US 11,503,477 B2
(45) Date of Patent: Nov. 15, 2022

(54) SYSTEM, VEHICLE, APPARATUSES, METHODS, AND COMPUTER PROGRAMS FOR USER EQUIPMENT AND FOR A NETWORK COMPONENT IN A MOBILE COMMUNICATION SYSTEM

(71) Applicants: Volkswagen Aktiengesellschaft, Wolfsburg (DE); MAN Truck & Bus SE, Munich (DE)

(72) Inventors: Ernst Zielinski, Bochum (DE); Roman Alieiev, Stendal (DE); Andreas Pfadler, Berlin (DE); Joakim Cerwall, Stockholm (SE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 87 days.

(21) Appl. No.: 16/816,606

(22) Filed: Mar. 12, 2020

(65) Prior Publication Data
US 2020/0296597 A1   Sep. 17, 2020

(30) Foreign Application Priority Data
Mar. 12, 2019 (EP) .................................. 19162329

(51) Int. Cl.
*H04W 16/22*      (2009.01)
*H04W 24/10*      (2009.01)
*H04W 64/00*      (2009.01)

(52) U.S. Cl.
CPC ........... *H04W 16/22* (2013.01); *H04W 24/10* (2013.01); *H04W 64/00* (2013.01)

(58) Field of Classification Search
CPC ...... H04W 16/22; H04W 24/10; H04W 64/00
See application file for complete search history.

(56) References Cited

U.S. PATENT DOCUMENTS

| | | | |
|---|---|---|---|
| 2014/0099978 A1* | 4/2014 | Egner | H04W 4/029 455/456.6 |
| 2014/0206414 A1* | 7/2014 | Oh | H04W 16/28 455/562.1 |
| 2015/0327181 A1 | 11/2015 | Bodas et al. | |

(Continued)

FOREIGN PATENT DOCUMENTS

| | | | | |
|---|---|---|---|---|
| CN | 101449498 A | * | 6/2009 | .......... H04L 5/0037 |
| EP | 2116863 A1 | | 11/2009 | |

(Continued)

OTHER PUBLICATIONS

3rd Generation Partnership Project; Technical Specification Group Radio Access Network; Study on Minimization of drive-tests in Next Generation Networks; (Release 9), 3GPP Standard; 3GPP TR 36.805, 3rd Generation Partnership Project (3GPP), Mobile Competence Centre; 650, Route Des Lucioles; F-06921 Sophia-Antipolis Cedex; France, vol. RAN WG2, No. V1.3.0, Jan. 30, 2010, pp. 1-20, XP050553695, paragraph 4.

(Continued)

*Primary Examiner* — Samina F Choudhry
(74) *Attorney, Agent, or Firm* — 2SPL Patent Attorneys PartG mbB; Yong Beom Hwang

(57) ABSTRACT

Embodiments relate to a system, a vehicle, apparatuses, methods, and computer programs for user equipment, UE, and a network component in a mobile communication system. The method (10) for UE (100) in the mobile communication system (400) comprises measuring (12) a radio channel quality based on a signal transmitted by a communication partner (102) in the mobile communication system (400) and determining (14) information related to a normalized measurement result based on the measured radio channel quality. The method (10) further comprises transmitting (16) the information related to the normalized mea- (Continued)

surement result to a network component (200) of the mobile communication system (400).

15 Claims, 3 Drawing Sheets

(56) References Cited

U.S. PATENT DOCUMENTS

| | | | |
|---|---|---|---|
| 2018/0041985 A1 | 2/2018 | Davaadorj et al. | |
| 2019/0037430 A1 | 1/2019 | Lee et al. | |

FOREIGN PATENT DOCUMENTS

| | | |
|---|---|---|
| JP | 10262006 A | 9/1998 |
| WO | 2008016778 A2 | 2/2008 |
| WO | 2014124894 A1 | 8/2014 |
| WO | 2018084985 A1 | 5/2018 |

OTHER PUBLICATIONS

Mediatek Inc: On sidelink resource allocation mechanism, 3GPP Draft; R1-1901812 On Sidelink Resource Allocation Mechanism, 3rd Generation Partnership Project (3GPP), Mobile Competence Centre; 650, Route Des Lucioles; F-06921 Sophie-Antipolis Cedex; France, vol. RAN WG1, No. Athens, Greece; Feb. 25, 2019-Mar. 1, 2019, Feb. 16, 2019, XP051599506, URL: http://www.3gpp.org/ftp/tsg%5Fran/WG1%5FRL1/TSGR1%5F96/Docs/R1%2D1901812%2Ezip, paragraph 2.1.1.

Greg Durgin et al., Measurements and Models for Radio Path Loss and Penetration Loss In and Around Homes and Trees at 5.85 GHz, IEEE Transactions on Communications, vol. 46, No. 11, Nov. 1998.

Shuangfeng Han et al., UL Sounding based multi-BS calibration scheme, IEEE 802.16 Broadband Wireless Access Working Group, submitted Jan. 31, 2009.

\* cited by examiner

SYSTEM, VEHICLE, APPARATUSES, METHODS, AND COMPUTER PROGRAMS FOR USER EQUIPMENT AND FOR A NETWORK COMPONENT IN A MOBILE COMMUNICATION SYSTEM

The present invention relates to a system, a vehicle, apparatuses, methods, and computer programs for user equipment, UE, and a network component in a mobile communication system, more particularly, but not exclusively, to a concept for determining and using information related to normalized measurements for quality of service (QoS) prediction in a mobile communication system.

Document WO 2014/124894 A1 relates to predicting a future QoS of a future service for a wireless device. The prediction is based on the number of wireless devices connected to an access point. Handover decisions are based on the prediction. Greg Durgin et al, "Measurements and Models for Radio Path Loss and Penetration Loss In and Around Homes and Trees at 5.85 GHz", IEEE TRANSACTIONS ON COMMUNICATIONS, VOL. 46, NO. 11, NOVEMBER 1998, describe a study on radio propagation pathloss in and around residential areas. Shuangfeng Han et al, "UL Sounding based multi-BS calibration scheme", IEEE 802.16 Broadband Wireless Access Working Group, Date Submitted 2009 Dec. 31, propose an antenna calibration for IEEE 802.16m. Document US 2015/0327181 A1 describes a concept for pathloss detection for broadcast transmission. A pathloss threshold is used to determine whether a UE transmits pathloss measurement results to a transmitter of a reference signal. Document JPH10262006 describes a concept for determining electric field intensity in a mobile communication area.

Conventional concepts evaluate certain channel quality measurements mainly to determine a coverage of a mobile communication system. However, such measurements do not form a sound basis for making predictions on QoS for other UEs.

There is a demand for an improved concept for enabling QoS prediction in a mobile communication system.

Embodiments are based on the finding that individual UE components and characteristics influence measurement results. For example, a receive signal strength at a UE gets influenced by the individual antenna gain of the UE for the respective receive direction. With the measurement being influenced by individual characteristics the measurement is not suitable for use with other UEs. It is a basic finding that a normalized measurement can be determined at the UE and provided to the network to enable QoS prediction based on the normalized measurement results also for other UEs and other services.

Embodiments provide a method for user equipment, UE, in a mobile communication system. The method comprises measuring a radio channel quality based on a signal transmitted by a communication partner in the mobile communication system. The method further comprises determining information related to a normalized measurement result based on the measured radio channel quality, and transmitting the information related to the normalized measurement result to a network component of the mobile communication system. Using normalized measurements, the results may be more universal and can easier be reused to predict conditions for other users.

The information related to the normalized measurement result may represent the radio channel quality with reduced influence of processing components of the UE at least in some embodiments. Reducing the influence of processing components of the UE may further contribute to having a generally or universally valid quality information of the radio channel.

For example, the influence of the processing components comprises one or more elements of the group of an antenna characteristic, an amplifier characteristic, a spatial reception scheme, a modem characteristic, and a filter characteristic. Reducing the influence of these individual processing components at the UE from the measurements may enable a more reliable prediction for another UE under the same conditions under application of the individual processing influences of said other UE.

In embodiments, the communication partner may be another UE. The normalized measurement results may refer to UE-to-UE communication, to a radio channel direct device-to-device communication, respectively. UE-to-UE channel prediction may be enabled using the normalized measurement results.

The information related to the normalized measurement result may comprise location information of the UE and location information of the communication partner, for example. Making a normalized measurement result available for radio channels of two locations may enable a more reliable prediction of the QoS or radio conditions for these locations, when used by other UEs.

In some embodiments the information related to the normalized measurement result comprises location information relative to a route of the UE. For example, when inter vehicle communication is used normalized measurements for certain route sections may be provided.

This may include route sections between two vehicles/UEs or between a UE and a base station, relay station or other network component.

The information related to the normalized measurement result may comprise time of day information of the UE and location information of the communication partner. Such information may further enhance the reliability of a prediction in further embodiments.

Embodiments also provide a method for a network component of a mobile communication system. A base station of the mobile communication system is an embodiment of such a network component. The method comprises receiving information related to a normalized measurement result from user equipment, UE, of the mobile communication system. The method further comprises determining a normalized radio map for the mobile communication system based on the information related to the normalized measurement result, and determining a quality of service, QoS, prediction based on the normalized radio map. A universal radio map may be generated based on the normalized measurement results. The universal radio map may be used for QoS prediction for certain services and UEs under consideration of the individual UE and service characteristics.

The normalized radio map may comprise information related to normalized radio channel qualities between different locations of UEs of the mobile communication system. The normalized radio map may be universally adapted to individual UEs, e.g. in terms of the number of antennas, whether a UE is a handheld or integrated in a vehicle, etc.

In some embodiments, the QoS prediction comprises predicted QoS for direct UE-to-UE services. QoS prediction for direct communication channels may be enabled by embodiments. For example, the determining of the QoS prediction may comprise considering an influence of individual processing components of the UEs for which the QoS is predicted. QoS prediction may be reliable and adapted to individual UE processing implementation in embodiments. Embodiments may enable QoS prediction for UEs having different individual processing components, e.g. for a handheld smartphone with two antennas and for a truck with a high gain array antenna (just to name different examples).

An apparatus for a UE in a mobile communication system is another embodiment. The apparatus comprises one or more interfaces configured to communicate in the mobile communication system. The apparatus further comprises a control module, which is configured to control the one or more interfaces. The control module is further configured to perform one of the methods described herein.

Embodiments also provide an apparatus for a network component in a mobile communication system. The apparatus comprises one or more interfaces configured to communicate in the mobile communication system. The apparatus further comprises a control module, which is configured to control the one or more interfaces. The control module is further configured to perform one of the methods described herein.

A vehicle comprising one or more of the apparatuses described herein is another embodiment.

Embodiments further provide a computer program having a program code for performing one or more of the above described methods, when the computer program is executed on a computer, processor, or programmable hardware component. A further embodiment is a computer readable storage medium storing instructions which, when executed by a computer, processor, or programmable hardware component, cause the computer to implement one of the methods described herein.

Some other features or aspects will be described using the following non-limiting embodiments of apparatuses or methods or computer programs or computer program products by way of example only, and with reference to the accompanying figures, in which.

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like or similar elements throughout the description of the figures.

As used herein, the term "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted in a like fashion.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" or "including", when used herein, specify the presence of stated features, integers, steps, operations, elements or components, but do not preclude the presence or addition of one or more other features, integers, steps, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
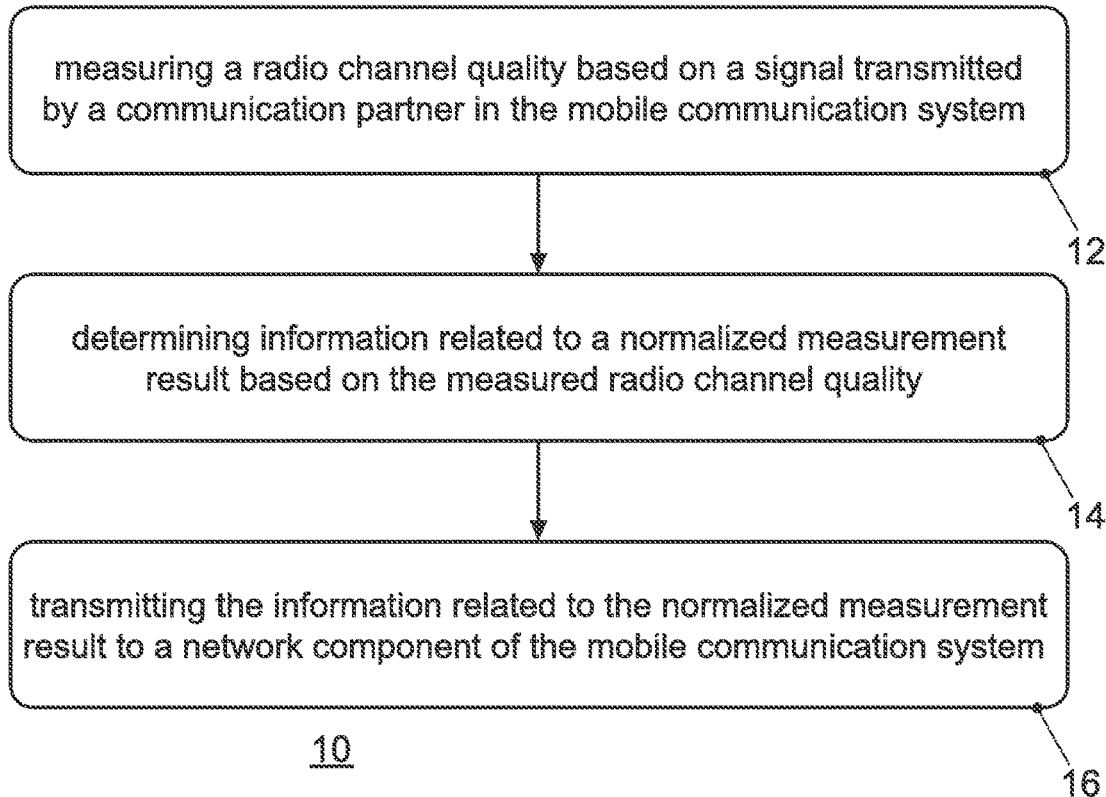
FIG. 1 illustrates a block diagram of an embodiment of a method for user equipment.

FIG. 1 illustrates a block diagram of an embodiment of a method 10 for a UE. The method 10 comprises measuring 12 a radio channel quality based on a signal transmitted by a communication partner 102 in the mobile communication system 400. The method 10 comprises determining 14 information related to a normalized measurement result based on the measured radio channel quality. The method 10 further comprises transmitting 16 the information related to the normalized measurement result to a network component 200 of the mobile communication system 400.

Figure 2:
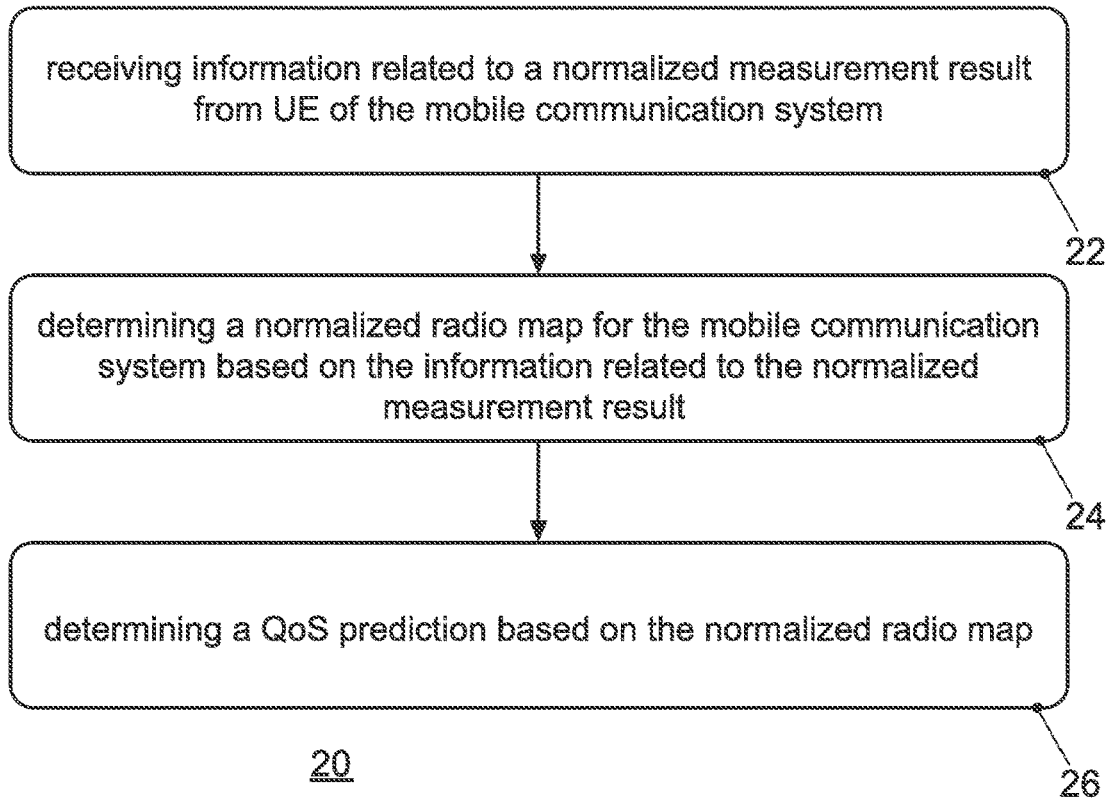
FIG. 2 illustrates a block diagram of an embodiment of a method for a network component.

FIG. 2 illustrates a block diagram of an embodiment of a method 20 for a network component 200 of a mobile communication system 400. As will be explained in more detail the network component 200 may be a base station, a relay station or a UE in embodiments. The method 20 for the network component 200 comprises receiving 22 information related to a normalized measurement result from UE 100 of the mobile communication system 400. The method 20 further comprises determining 24 a normalized radio map for the mobile communication system 400 based on the information related to the normalized measurement result. The method 20 further comprises determining 26 a QoS prediction based on the normalized radio map.

Figure 3:
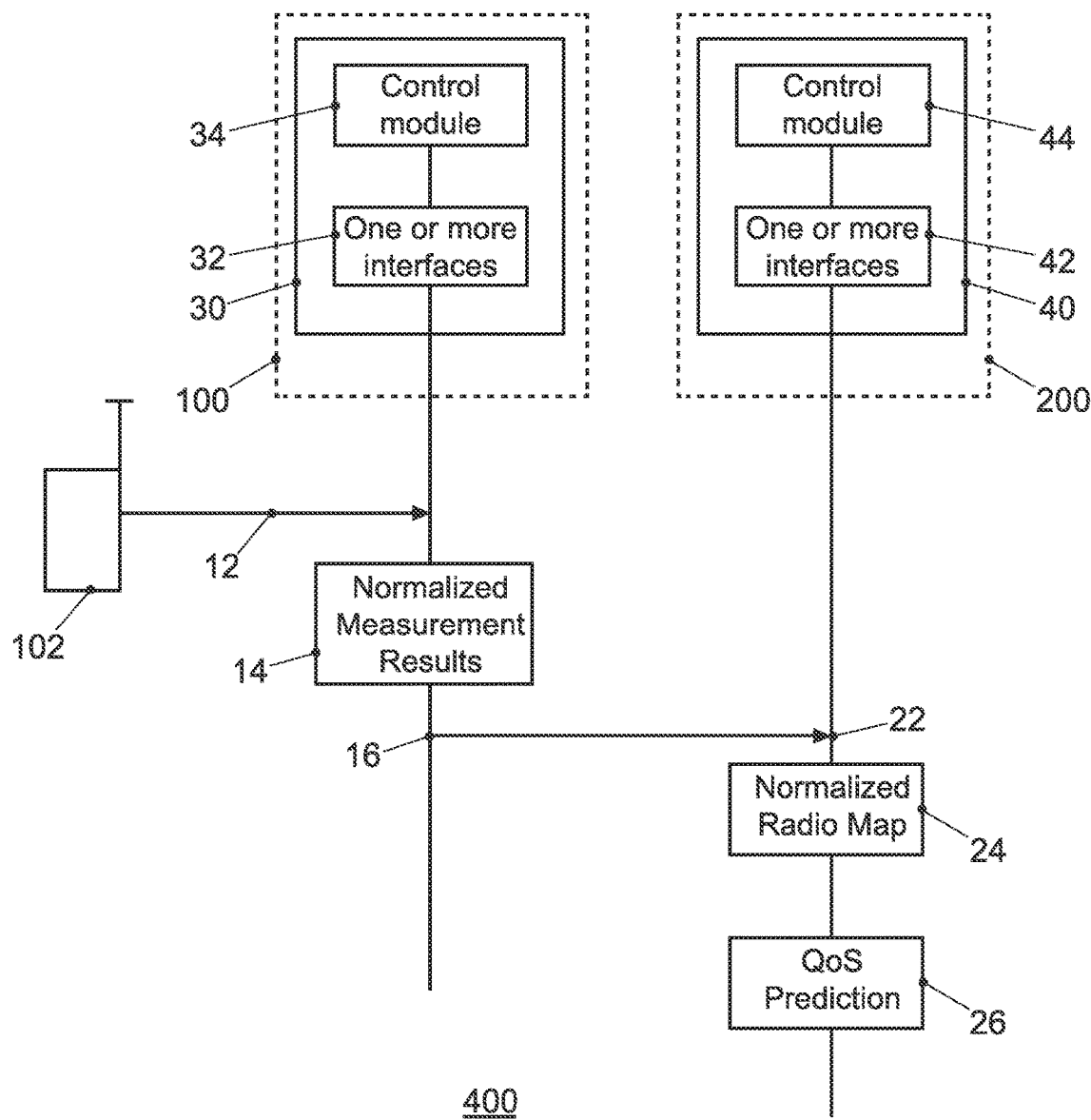
FIG. 3 shows an embodiment of an apparatus for a UE, an embodiment of an apparatus for a network component, and an embodiment of a system.

The mobile communication system 400, as shown in FIG. 3, may, for example, correspond to one of the Third Generation Partnership Project (3GPP)-standardized mobile communication networks, where the term mobile communication system is used synonymously to mobile communication network. The mobile or wireless communication system 400 may correspond to a mobile communication system of the 5th Generation (5G, or New Radio) and may use mm-Wave technology. The mobile communication system may correspond to or comprise, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

Service provision may be carried out by a network component 200, such as a base station transceiver, a relay station or a UE, e.g. coordinating service provision in a cluster or group of multiple UEs. A base station transceiver can be operable or configured to communicate with one or more active mobile transceivers/vehicles 100 and a base station transceiver can be located in or adjacent to a coverage area of another base station transceiver, e.g. a macro cell base station transceiver or small cell base station transceiver. Hence, embodiments may provide a mobile communication system 400 comprising two or more mobile transceivers/vehicles 100 and one or more base station transceivers, wherein the base station transceivers may establish macro cells or small cells, as e.g. pico-, metro-, or femto cells. A mobile transceiver or UE may correspond to a smartphone, a cell phone, a laptop, a notebook, a personal computer, a Personal Digital Assistant (PDA), a Universal Serial Bus (USB)-stick, a car, a vehicle etc. A mobile transceiver may also be referred to as User Equipment (UE) or mobile in line with the 3GPP terminology. A vehicle may correspond to any conceivable means for transportation, e.g. a car, a bike, a motorbike, a van, a truck, a bus, a ship, a boat, a plane, a train, a tram, etc.

A base station transceiver can be located in the fixed or stationary part of the network or system. A base station transceiver may be or correspond to a remote radio head, a transmission point, an access point, a macro cell, a small cell, a micro cell, a femto cell, a metro cell etc. A base station transceiver can be a wireless interface of a wired network, which enables transmission of radio signals to a UE or mobile transceiver. Such a radio signal may comply with radio signals as, for example, standardized by 3GPP or, generally, in line with one or more of the above listed systems. Thus, a base station transceiver may correspond to a NodeB, an eNodeB, a Base Transceiver Station (BTS), an access point, a remote radio head, a relay station, a transmission point etc., which may be further subdivided in a remote unit and a central unit.

A mobile transceiver 100 can be associated with a base station transceiver or cell. The term cell refers to a coverage area of radio services provided by a base station transceiver, e.g. a NodeB (NB), an eNodeB (eNB), a remote radio head, a transmission point, etc. A base station transceiver may operate one or more cells on one or more frequency layers, in some embodiments a cell may correspond to a sector. For example, sectors can be achieved using sector antennas, which provide a characteristic for covering an angular section around a remote unit or base station transceiver. In some embodiments, a base station transceiver may, for example, operate three or six cells covering sectors of 120° (in case of three cells), 60° (in case of six cells) respectively. A base station transceiver may operate multiple sectorized antennas. In the following a cell may represent an according base station transceiver generating the cell or, likewise, a base station transceiver may represent a cell generated by the base station transceiver.

Mobile transceivers 100 may communicate directly with each other, i.e. without involving any base station transceiver, which is also referred to as Device-to-Device (D2D) communication. An example of D2D is direct communication between vehicles, also referred to as Vehicle-to-Vehicle communication (V2V), car-to-car using 802.11p, respectively.

FIG. 3 shows an embodiment of an apparatus 30 for a UE 100, an embodiment of an apparatus 40 for a network component 200, and an embodiment of a system 400. The apparatus 30 for the UE 100 comprises one or more interfaces 32 configured to communicate in the mobile communication system 400. The apparatus 30 further comprises a control module 34, which is coupled to the one or more interfaces 32 and which is configured to control the one or more interfaces 32. The control module 34 is further configured to perform one of the methods 10 as described herein.

The apparatus 40 for the network component 200 in a mobile communication system 400 comprises one or more interfaces 42, which are configured to communicate in the mobile communication system 400. The apparatus 40 further comprises a control module 44, which is coupled to the one or more interfaces 42 and which is configured to control the one or more interfaces 42. The control module 44 is further configured to perform one of the methods 20 as described herein. The apparatus 40 may be comprised in a base station 200, a NodeB, a UE, a relay station, or any service coordinating network entity in embodiments. A further embodiment is a vehicle comprising the apparatus 30 and/or the apparatus 40.

In embodiments the one or more interfaces 32, 42 may correspond to any means for obtaining, receiving, transmitting or providing analog or digital signals or information, e.g. any connector, contact, pin, register, input port, output port, conductor, lane, etc. which allows providing or obtaining a signal or information. An interface may be wireless or wireline and it may be configured to communicate, i.e. transmit or receive signals, information with further internal or external components. The one or more interfaces 32, 42 may comprise further components to enable according communication in the mobile communication system 400, such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. The one or more interfaces 32, 42 may be coupled to one or more antennas, which may correspond to any transmit and/or receive antennas, such as horn antennas, dipole antennas, patch antennas, sector antennas etc. The antennas may be arranged in a defined geometrical setting, such as a uniform array, a linear array, a circular array, a triangular array, a uniform field antenna, a field array, combinations thereof, etc. In some examples the one or more interfaces 32, 42 may serve the purpose of transmitting or receiving or both, transmitting and receiving, information, such as information related to capabilities, application requirements, trigger indications, requests, message interface configurations, feedback, information related to control commands, QoS requirements, QoS time courses, QoS maps, etc.

As shown in FIG. 3 the respective one or more interfaces 32, 42 are coupled to the respective control modules 34, 44 at the apparatuses 30, 40. In embodiments the control modules 34, 44 may be implemented using one or more processing units, one or more processing devices, any means for processing, such as a processor, a computer or a programmable hardware component being operable with accordingly adapted software. In other words, the described functions of the control modules 34, 44 may as well be implemented in software, which is then executed on one or more programmable hardware components. Such hardware components may comprise a general purpose processor, a Digital Signal Processor (DSP), a micro-controller, etc.

FIG. 3 also shows an embodiment of a system 400 comprising embodiments of UE 100, and a base station 200 comprising the apparatus 40. In embodiments, communication, i.e. transmission, reception or both, may take place among mobile transceivers/vehicles 100 directly and/or between mobile transceivers/vehicles 100 and a network component (infrastructure or mobile transceiver, e.g. a base station, a network server, a backend server, etc.). Such communication may make use of a mobile communication system 400. Such communication may be carried out directly, e.g. by means of device-to-device (D2D) communication, which may also comprise vehicle-to-vehicle (V2V) or car-to-car communication in case of vehicles 100. Such communication may be carried out using the specifications of a mobile communication system 400.

In embodiments the one or more interfaces 32, 42 can be configured to wirelessly communicate in the mobile communication system 400. In order to do so radio resources are used, e.g. frequency, time, code, and/or spatial resources, which may be used for wireless communication with a base station transceiver as well as for direct communication. The assignment of the radio resources may be controlled by a base station transceiver, i.e. the determination which resources are used for D2D and which are not. Here and in the following radio resources of the respective components may correspond to any radio resources conceivable on radio carriers and they may use the same or different granularities on the respective carriers. The radio resources may correspond to a Resource Block (RB as in LTE/LTE-A/LTE-unlicensed (LTE-U)), one or more carriers, sub-carriers, one or more radio frames, radio sub-frames, radio slots, one or more code sequences potentially with a respective spreading factor, one or more spatial resources, such as spatial sub-channels, spatial precoding vectors, any combination thereof, etc.

For example, in direct cellular vehicle-to-anything (C-V2X), where V2X includes at least V2V, V2-Infrastructure (V2I), etc., transmission according to 3GPP Release 14 onward can be managed by infrastructure (so-called mode 3) or run in a UE.

FIG. 3 also illustrates the methods 10 and 20 as described above. For example, the communication partner 102 of the UE 100 can be another UE such as in an inter-vehicle communication scenario. The communication partner (other vehicle) 102 transmits a reference signal/symbol and the UE 100 measures 12 the radio channel quality based on the signal/symbol transmitted by the communication partner 102 in the mobile communication system 400. The reference signal/symbol may be any predefined or known symbol transmitted on any predefined or known radio resource. For example, in 3GPP systems several such reference or pilot symbols are defined, examples are reference symbols per cell, per antenna port, UE specific, for positioning, for channel state information, demodulation reference symbols, etc.

Based on the measured radio channel quality the UE 100 can determine 14 information related to a normalized measurement result and transmit 16 the information related to the normalized measurement result to the network component 200 (e.g. an eNB) of the mobile communication system 400.

On the network component's side 200 the information related to the normalized measurement result is received 22 from the UE 100. The network component 200 determines 24 a normalized radio map for the mobile communication system 400 based on the information related to the normalized measurement result and further determines 26 a QoS prediction based on the normalized radio map.

The information related to the normalized measurement result may represent the radio channel quality with reduced influence of processing components of the UE 100 in some embodiments. Depending on implementation specifics, measurements taken by a UE 100 get influenced. For example, the influence of the processing components may comprise one or more elements of the group of an antenna characteristic, an amplifier characteristic, a spatial reception scheme, a modem characteristic, and a filter characteristic. Other factors may be whether the UE 100 is a handheld or a vehicle. For example, antenna arrangements may differ significantly depending on whether they are integrated in a vehicle, e.g. a truck, or in a handheld. Filter, amplifier and other components characteristics may differ from UE to UE. In embodiments the normalized measurement may be based on a signal-to-noise ratio (SNR), signal-to-interference ratio (SIR), signal-to-noise-and-interference ratio (SINR), receive power strength, receive signal code power (RSCP), receive signal strength indicator (RSSI), pathloss, latency, etc., in which the individual influence of the processing components is reduced. In embodiments the information related to the normalized measurement result may be quantized information, e.g. discrete values or resolutions. Moreover, at least in some embodiments additional probability/reliability information as a quality information on the information related to the normalized measurement may be provided by the UE 100. Such information may be part of the information related to the normalized measurement result or separate information. The network component 200 receiving the information related to the normalized measurement result and the quality information can then determine a more reliable QoS prediction.

In embodiments the term "normalized" may hence refer to adaptation and/or amendment of a measurement, e.g. by using scaling, shifting or other computational operations, with the intention to enable comparison of corresponding normalized measurements of different UEs in a way that eliminates individual effects of the respective UE and/or its environment. The normalized measurement may then be universally used for predictions for other UEs under the same condition, e.g. at the same location, time, network load, situation, environment, etc.

As described above, the network component 200 may determine a predicted QoS from the normalized radio map, which may be provided to UEs in the same situation. The method 20 may hence comprise transmitting information related to the predicted QoS to the UE. Likewise, the method 10 may comprise receiving information related to a predicted QoS from the network component. The predicted QoS may be provided to a UE in many use cases. For example, a normalized QoS prediction (based on the normalized radio map) is done in the network. The normalized QoS prediction is provided to a UE, and the UE determines an actual quality of service through application of its individual characteristics. Potentially, the prediction of the actual QoS may take place on the UE side or on the network side. A normalized radio quality prediction may be provided from the network to a UE forming a basis for QoS prediction. The ability of determining a predicted QoS may be implemented in a network component and/or a UE.

The network component 200 may hence provide a UE with information or a message based on which the QoS can be predicted in some embodiments. Some processing steps can be implemented either on the network component's side or on the UE's side. For example, the normalized radio map may provide a normalized path loss for a future location. Based on the path loss and an interference condition a normalized signal quality may be predicted. Such prediction may take place at the network component or at the UE. For example, the UE or network component may have interference measurements/predictions available.

In an embodiment a UE 100 may use an antenna with certain characteristics, e.g. a varying antenna gain depending on the angle of arrival of a receive signal (elevation, azimuth). For the direction the reference symbol was received from, the antenna gain may be 3 dB and a measured receive signal strength may be −70 dBm. In order to normalize said measurement the influence of the antenna gain is reduced by subtracting the 3 dB gain and reporting −73 dBm as normalized measurement to the network. The network may also use an expected receive signal strength as QoS prediction and hence provide the −73 dBm as a predicted value for the same location to another UE, which is approaching this location. The other UE, however, uses a better antenna, which provides for the expected direction 6 dB antenna gain. Hence, the expected receive signal strength at the location may be −67 dBm for the other UE. Similar considerations may apply for different receive diversity concepts (e.g. differing numbers of receive antennas, maximum-ratio versus selection combining), multiple-input-multiple-output concepts, interference cancellation receivers, etc.

In further embodiments weather or other varying influences may also be reduced. In general, the normalized measurements may be rendered as universal as possible, such that it can be used to predict certain QoS for other UEs, which can then apply their individual processing characteristics to determine a more realistic prediction based on a normalized prediction. That is to say that in some embodiments the prediction of the QoS as carried out at the network component 200 may be normalized as well. UEs making use of such prediction may then modify the normalized prediction with their individual processing characteristics to determine their actual QoS prediction. By using normalized metrics, a more universal basis can be formed and a more universal prediction of QoS can be provided. Based on the same normalized values UEs with different processing characteristics may be enabled to derive their individual QoS prediction.

Figure 4:
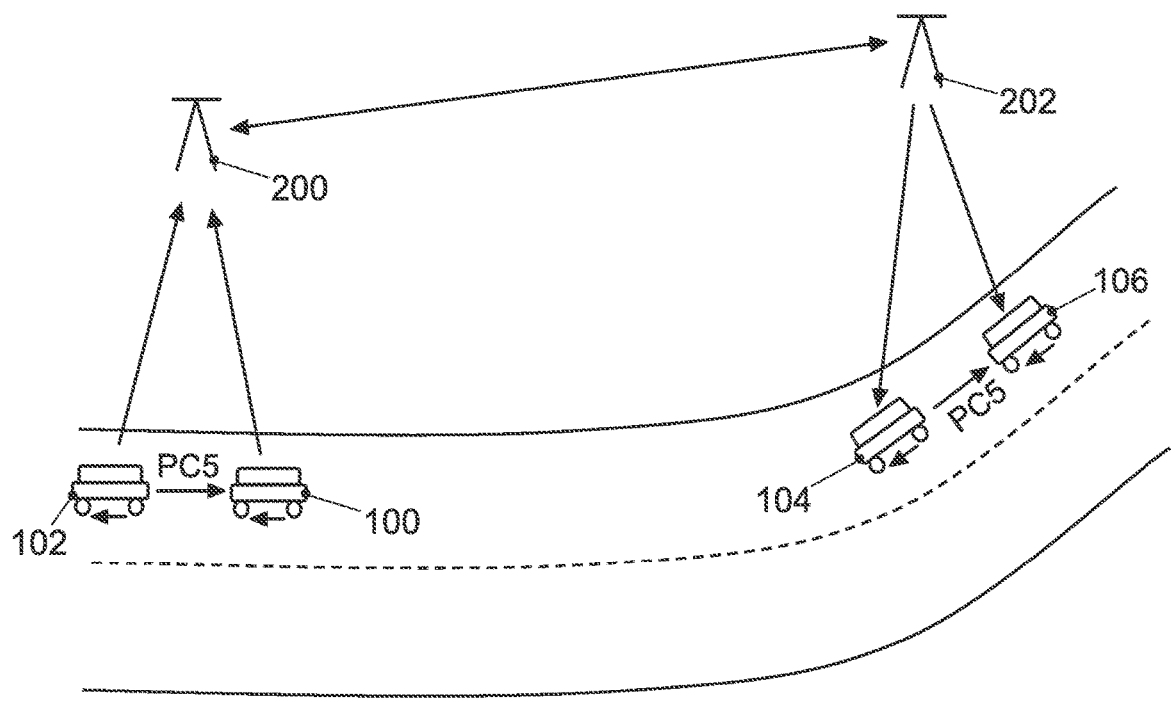
FIG. 4 illustrates an example of QoS prediction in an embodiment.

For example, the information related to the normalized measurement result comprises location information of the UE 100 and location information of the communication partner 102. In some embodiments the information related to the normalized measurement result may comprise location information relative to a route of the UE 100. FIG. 4 illustrates an example of QoS prediction in an embodiment. In FIG. 4 UE 100 and the communication partner 102 are two vehicles driving down a road from right to left. The vehicles 100, 102 communicate with each other using 3GPP PC5 link (sidelink for direct communication). UE 100 measures the radio quality of the sidelink and reports information on the normalized measurement result to the network component, which is a gNB 200 in this embodiment. It is assumed that vehicle 102 does the same and that gNB 200 develops a normalized PC5 radio map based on the normalized measurement results. Based on the normalized radio map the network component 200 can predict a QoS on PC5 for vehicles 104 and 106. As shown in FIG. 4 these two vehicles communicate using PC5 and are in coverage of another gNB 202. The gNBs 200, 202 can communicate with each other using the network's infrastructure, e.g. via the 3GPP X2 interface. In the present embodiment it is further assumed that the individual processing characteristics of the vehicles 100, 102, 104, 106 are different from each other, for example, the vehicles use different numbers of antennas and different radio modems. Because of the normalized measurement results, in which the influence of these individual components is reduced (ideally even eliminated), a universal prediction be provided. Hence vehicles 104 and 106 can apply their individual processing characteristics to the prediction and reliably conclude on the PC5 radio quality once they reach the location of vehicles 102, 100.

The information related to the normalized measurement result may comprise time of day information of the UE 100 and location information of the communication partner 102. The radio channel quality may be subject to many factors, which may change during the day. At the same location different radio channels may be experienced at different times of day, e.g. in the early morning or the middle of the night compared to rush hours. The normalized radio map may comprise information related to normalized radio channel qualities between different locations of UEs 100, 102 of the mobile communication system 400. As laid out above, the QoS prediction may comprise predicted QoS for direct UE-to-UE services, e.g. sidelink or PC5 communications in FIG. 4. In further embodiments communication with infrastructure is also conceivable. E.g. in another embodiment communication may take place between UE 100 and the network component 200 (UE to gNB or vehicle-to-infrastructure) on the Uu interface. Accordingly, normalized measurement results can be determined at the UE 100 for the radio channel quality on the Uu interface and transmitted to the NodeB 200. In a similar fashion as described above for PC5 a normalized radio map can be determined for the Uu interface. The normalized values can then be used to predict QoS for other UEs.

In further embodiments the determining of the QoS prediction comprises considering an influence of processing components of the UEs for which the QoS is predicted. This can take place at the network component 200 or at the UE, e.g. a normalized QoS prediction may take place at the network component 200 and be provided to the UE. The UE may then apply some individual influences and determine the actual QoS to be expected. In other embodiments the application on the individual UE characteristic may as well be carried out at the network component 200 assuming the UE characteristics are known. The predicted QoS is then also know to the network component 200, which can make use of such prediction as well, e.g. when it comes to future load sharing, load distribution, radio resource management etc.

In some embodiments the predicted QoS may be determined at the network component 200 and, additionally or alternatively, used for further radio resource management. Hence, in some embodiments the predicted QoS is not transmitted to the UEs but used only used at the network component 200. For example, the predicted QoS could be used for scheduling. This way, at least some embodiments may improve scheduling as the network component 200 is enabled to determine the actual quality of service as well (for example in case the network component 200 knows the relevant specifications/individual characteristics of the UE to be scheduled). In further embodiments the mechanism at the network component 200 may be the other way around. The future scheduling of radio resources may determine the future QoS. For example, the future scheduling may influence an interference condition in the network, which in turn will influence the QoS. Predicting the QoS requirements may have impact on the future scheduling. Predicting the future scheduling impacts the future QoS. In some embodiments network components/schedulers may even coordinate their future scheduling, QoS or predicted QoS with each other to reach a system wide improvement. If one scheduler knows a future interference condition for available radio resources from a neighbor scheduler, this can be taken into account, again for QoS prediction and/or for future scheduling.

As already mentioned, in embodiments the respective methods may be implemented as computer programs or codes, which can be executed on a respective hardware. Hence, another embodiment is a computer program having a program code for performing at least one of the above methods, when the computer program is executed on a computer, a processor, or a programmable hardware component. A further embodiment is a (non-transitory) computer readable storage medium storing instructions which, when executed by a computer, processor, or programmable hardware component, cause the computer to implement one of the methods described herein.

A person of skill in the art would readily recognize that steps of various above-described methods can be performed by programmed computers, for example, positions of slots may be determined or calculated. Herein, some embodiments are also intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as magnetic disks and magnetic tapes, hard drives, or optically readable digital data storage media. The embodiments are also intended to cover computers programmed to perform said steps of methods described herein or (field) programmable logic arrays ((F)PLAs) or (field) programmable gate arrays ((F)PGAs), programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

LIST OF REFERENCE SIGNS 10 method for user equipment
12 measuring a radio channel quality based on a signal transmitted by a communication partner in the mobile communication system
14 determining information related to a normalized measurement result based on the measured radio channel quality
16 transmitting the information related to the normalized measurement result to a network component of the mobile communication system
20 method for network component
22 receiving information related to a normalized measurement result from UE of the mobile communication system
24 determining a normalized radio map for the mobile communication system based on the information related to the normalized measurement result
26 determining a QoS prediction based on the normalized radio map
30 apparatus for user equipment
32 one or more interfaces
34 control module
40 apparatus for network component
42 one or more interfaces 44 control module
100 user equipment
102 communication partner, user equipment
104 user equipment
106 user equipment
200 base station, network component
400 mobile communication system

The invention claimed is:

1. A method for user equipment, UE, in a mobile communication system, the method comprising
measuring a radio channel quality based on a signal transmitted by a communication partner in the mobile communication system;
determining information related to a normalized measurement result based on the measured radio channel quality by reducing influence of processing components of the UE from the measured radio channel quality; and
transmitting the information related to the normalized measurement result to a network component of the mobile communication system,
wherein the information related to the normalized measurement result represents the radio channel quality with reduced influence of processing components of the UE.

2. The method of claim 1, wherein the influence of the processing components comprises one or more elements of the group of an antenna characteristic, an amplifier characteristic, a spatial reception scheme, a modem characteristic, and a filter characteristic.

3. The method of claim 1, wherein the communication partner is another UE.

4. The method of claim 1, wherein the information related to the normalized measurement result comprises location information of the UE and location information of the communication partner.

5. The method of claim 4, wherein the information related to the normalized measurement result comprises location information relative to a route of the UE.

6. The method of claim 1, wherein the information related to the normalized measurement result comprises time of day information of the UE and location information of the communication partner.

7. A method for a network component of a mobile communication system, the method comprising
receiving information related to a normalized measurement result from user equipment, UE, of the mobile communication system, wherein the information related to a normalized measurement result is determined by reducing influence of processing components of the UE from measured radio channel quality by the UE;
determining a normalized radio map for the mobile communication system based on the information related to the normalized measurement result; and
determining a quality of service, QoS, prediction based on the normalized radio map,
wherein the information related to the normalized measurement result represents a radio channel quality with reduced influence of processing components of the UE.

8. The method of claim 7, wherein the normalized radio map comprises information related to normalized radio channel qualities between different locations of UEs of the mobile communication system.

9. The method of claim 7, wherein the QoS prediction comprises predicted QoS for direct UE-to-UE services.

10. The method of claim 9, wherein the determining of the QoS prediction comprises considering an influence of processing components of the UEs for which the QoS is predicted.

11. An apparatus for user equipment, UE, in a mobile communication system, the apparatus comprising
one or more interfaces configured to communicate in the mobile communication system; and
a control module configured to control the one or more interfaces, wherein the control module is further configured to perform a method comprising
measuring a radio channel quality based on a signal transmitted by a communication partner in the mobile communication system;
determining information related to a normalized measurement result based on the measured radio channel quality by reducing influence of processing components of the UE from the measured radio channel quality; and
transmitting the information related to the normalized measurement result to a network component of the mobile communication system,
wherein the information related to the normalized measurement result represents the radio channel quality with reduced influence of processing components of the UE.

12. An apparatus for a network component in a mobile communication system, the apparatus comprising
one or more interfaces configured to communicate in the mobile communication system; and
a control module configured to control the one or more interfaces, wherein the control module is further configured to perform a method comprising
receiving information related to a normalized measurement result from user equipment, UE, of the mobile communication system, wherein the information related to a normalized measurement result is determined by reducing influence of processing components of the UE from measured radio channel quality by the UE;
determining a normalized radio map for the mobile communication system based on the information related to the normalized measurement result; and
determining a quality of service, QoS, prediction based on the normalized radio map,
wherein the information related to the normalized measurement result represents a radio channel quality with reduced influence of processing components of the UE.

13. A vehicle comprising the apparatus of claim 11 or the apparatus of claim 12.

14. A non-transitory computer readable storage medium storing instructions which, when executed by a computer, processor, or programmable hardware component, cause the computer to implement a method comprising
measuring a radio channel quality based on a signal transmitted by a communication partner in the mobile communication system;
determining information related to a normalized measurement result based on the measured radio channel quality by reducing influence of processing components of the UE from the measured radio channel quality; and
transmitting the information related to the normalized measurement result to a network component of the mobile communication system,
wherein the information related to the normalized measurement result represents the radio channel quality with reduced influence of processing components of the UE.

15. A non-transitory computer readable storage medium storing instructions which, when executed by a computer, processor, or programmable hardware component, cause the computer to implement a method comprising
- receiving information related to a normalized measurement result from user equipment, UE, of the mobile communication system, wherein the information related to a normalized measurement result is determined by reducing influence of processing components of the UE from measured radio channel quality by the UE;
- determining a normalized radio map for the mobile communication system based on the information related to the normalized measurement result; and
- determining a quality of service, QoS, prediction based on the normalized radio map,
- wherein the information related to the normalized measurement result represents a radio channel quality with reduced influence of processing components of the UE.

* * * * *